United States Patent
Kang et al.

(10) Patent No.: US 11,965,434 B2
(45) Date of Patent: Apr. 23, 2024

(54) COMBINED POWER PLANT AND METHOD FOR OPERATING COMBINED POWER PLANT

(71) Applicant: DOOSAN ENERBILITY CO., LTD, Changwon-si (KR)

(72) Inventors: Sung Gju Kang, Changwon (KR); Hyun Hu Kang, Changwon (KR); Gwang Soo Jang, Changwon (KR); Song Hun Cha, Osan (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 95 days.

(21) Appl. No.: 17/578,990

(22) Filed: Jan. 19, 2022

(65) Prior Publication Data
US 2023/0131286 A1  Apr. 27, 2023

(30) Foreign Application Priority Data
Oct. 27, 2021  (KR) ......................... 10-2021-0145025

(51) Int. Cl.
*F01K 23/10* (2006.01)
*C01B 3/04* (2006.01)
(Continued)

(52) U.S. Cl.
CPC ............. *F01K 23/10* (2013.01); *C01B 3/047* (2013.01); *F01K 25/06* (2013.01); *F02C 3/20* (2013.01); *F23R 3/36* (2013.01); *Y02E 20/16* (2013.01)

(58) Field of Classification Search
None
See application file for complete search history.

(56) References Cited

U.S. PATENT DOCUMENTS

| 2006/0053792 A1* | 3/2006 | Bourgeois | C25B 1/04 60/670 |
| 2007/0095046 A1* | 5/2007 | Wallace | B01J 4/001 60/39.12 |

(Continued)

FOREIGN PATENT DOCUMENTS

| EP | 4001618 A2 * | 5/2022 | ............. C01B 3/047 |
| GB | 2544552 A * | 5/2017 | ............. C01B 3/047 |

(Continued)

OTHER PUBLICATIONS

WO-2018088184-A1, English language machine translation (Year: 2018).*
The Korean Office Action dated Dec. 26, 2022.

*Primary Examiner* — Wesley G Harris
(74) *Attorney, Agent, or Firm* — Harvest IP Law, LLP (57) ABSTRACT

A combined power plant is provided. The combined power plant includes a gas turbine configured to combust fuel to generate a rotating force, a boiler configured to heat water to generate steam, an ammonia decomposition apparatus configured to receive a combustion gas generated in the gas turbine to thermally decompose ammonia to generate a decomposed gas containing hydrogen, nitrogen, and a residual ammonia, a steam turbine configured to generate a rotating force using the steam generated in the boiler, and a decomposed gas supply line configured to supply the decomposed gas generated in the ammonia decomposition apparatus to a combustor of the gas turbine.

16 Claims, 6 Drawing Sheets

(51) Int. Cl.
  *F01K 25/06* (2006.01)
  *F02C 3/20* (2006.01)
  *F23R 3/36* (2006.01)

(56) References Cited

U.S. PATENT DOCUMENTS

| | | | | |
|---|---|---|---|---|
| 2009/0211155 | A1* | 8/2009 | Avagliano | C10J 3/86 |
| | | | | 48/78 |
| 2009/0239959 | A1* | 9/2009 | Wallace | C10K 3/06 |
| | | | | 518/700 |
| 2019/0088962 | A1* | 3/2019 | Chikugo | H01M 8/04753 |
| 2021/0332759 | A1* | 10/2021 | Smith | F02C 7/224 |

FOREIGN PATENT DOCUMENTS

| | | | | |
|---|---|---|---|---|
| JP | 2016183641 | A | | 10/2016 |
| JP | 2018076794 | A | | 5/2018 |
| JP | 6417565 | B2 | * | 11/2018 |
| WO | WO-2018088184 | A1 | * | 5/2018 ............. F01K 23/10 |

\* cited by examiner

COMBINED POWER PLANT AND METHOD FOR OPERATING COMBINED POWER PLANT

CROSS-REFERENCE TO RELATED APPLICATION

This application claims priority to Korean Patent Application No. 10-2021-0145025, filed on Oct. 27, 2021, the disclosure of which is incorporated by reference herein in its entirety.

BACKGROUND

Field

Apparatuses and methods consistent with exemplary embodiments relate to a combined power plant and a method for operating the combined power plant, and more particularly, to a combined power plant having a gas turbine and an ammonia decomposition apparatus and a method for operating the combined power plant.

Description of the Related Art

A combined power plant is a power plant configured to combine a gas turbine and a steam turbine with high efficiency to guide a high-temperature exhaust gas from the gas turbine to a boiler and to generate steam by thermal energy retained in the exhaust gas through a heat recovery steam generator (HRSG). This steam enables power generation by the steam turbine and can be combined with the power generated by the gas turbine, thereby improving thermal efficiency equal to the thermal energy retained in the exhaust gas when compared to independent power production by the gas turbine.

The gas turbine is a power engine for mixing and combusting compressed air compressed in a compressor and fuel, and rotating a turbine with the high-temperature combustion gas generated by a combustor. The gas turbine is used to drive a generator, an aircraft, a ship, a train, or the like.

The combustion gas generated in the gas turbine is supplied to the boiler to generate steam in the boiler, the temperature of the combustion gas discharged from the gas turbine is 550 to 650 degrees Celsius, and the combustion air temperature of the boiler is 200 to 300 degrees Celsius. Therefore, to supply the combustion gas discharged from the gas turbine to the related art boiler, it is inconvenient to change a material of the boiler and to strengthen the design.

On the other hand, the related art gas turbine has a problem in that a lot of carbon dioxide is generated due to using a natural gas or a coal, that is a hydrocarbon-based fuel, as a main fuel.

SUMMARY

Aspects of one or more exemplary embodiments provide a combined power plant and a method for operating the combined power plant which can contribute to carbon neutralization and solve difficulties of boiler design.

Additional aspects will be set forth in part in the description which follows and, in part, will become apparent from the description, or may be learned by practice of the exemplary embodiments.

According to an aspect of an exemplary embodiment, there is provided a combined power plant including: a gas turbine configured to combust fuel to generate a rotating force, a boiler configured to heat water to generate steam, an ammonia decomposition apparatus configured to receive a combustion gas generated in the gas turbine to thermally decompose ammonia to generate a decomposed gas containing hydrogen, nitrogen, and a residual ammonia, a steam turbine configured to generate a rotating force using the steam generated in the boiler; and a decomposed gas supply line configured to supply the decomposed gas generated in the ammonia decomposition apparatus to a combustor of the gas turbine.

A fuel gas supply line configured to supply fuel can be connected to the boiler, and the decomposed gas supply line can be connected to the fuel gas supply line to supply the decomposed gas to the fuel gas supply line.

The combined power plant can further include a hydrogen gas supply line configured to supply a hydrogen gas to the combustor of the gas turbine.

A hydrogen tank configured to store hydrogen gas can be connected to the hydrogen gas supply line.

The combined power plant can further include a hydrogen gas delivery line configured to deliver hydrogen gas stored in the hydrogen tank to the fuel gas supply line.

The combined power plant can further include an ammonia supply line configured to supply ammonia to the ammonia decomposition apparatus.

An ammonia tank configured to store ammonia can be connected to the ammonia supply line.

The combined power plant can further include an ammonia delivery line configured to deliver ammonia stored in the ammonia tank to the fuel gas supply line.

The combined power plant can further include a first combustion gas supply line configured to supply combustion gas discharged from the gas turbine to the ammonia decomposition apparatus.

The combined power plant can further include a second combustion gas supply line configured to supply combustion gas used in the ammonia decomposition apparatus to the boiler.

A decomposed gas extraction line configured to extract decomposed gas can be connected to the ammonia decomposition apparatus, and a hydrogen extraction device configured to extract hydrogen gas from the decomposed gas can be connected to the decomposed gas extraction line.

According to an aspect of another exemplary embodiment, there is provided a combined power plant including: a gas turbine configured to combust fuel to generate a rotating force, an ammonia decomposition apparatus configured to receive a combustion gas generated in the gas turbine to thermally decompose ammonia to generate a decomposed gas containing hydrogen, nitrogen, and a residual ammonia, and a decomposed gas supply line configured to supply the decomposed gas generated in the ammonia decomposition apparatus to a combustor of the gas turbine.

The combined power plant can further include a hydrogen gas supply line configured to supply a hydrogen gas to the combustor of the gas turbine.

The combined power plant can further include a first combustion gas supply line configured to supply combustion gas discharged from the gas turbine to the ammonia decomposition apparatus.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and various embodiments will be described in detail with reference to the accompanying drawings. It should be understood, however, that the various embodiments are not for limiting the scope of the disclosure to the specific embodiment, but they should be interpreted to include all modifications, equivalents, and alternatives of the embodiments included within the sprit and scope disclosed herein.

The terms used herein are used to describe only a specific exemplary embodiment, and are not intended to limit the scope of the disclosure. The singular forms include the plural forms unless the context clearly indicates otherwise. Further, it should be understood that the terms "comprise" or "include" specify the presence of features, integers, steps, operations, components, parts or a combination thereof described in the specification, but do not preclude the presence or addition possibility of one or more other features, integers, steps, operations, components, parts or a combination thereof.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Hereinafter, a gas turbine according to a first exemplary embodiment will be described.

Figure 1:
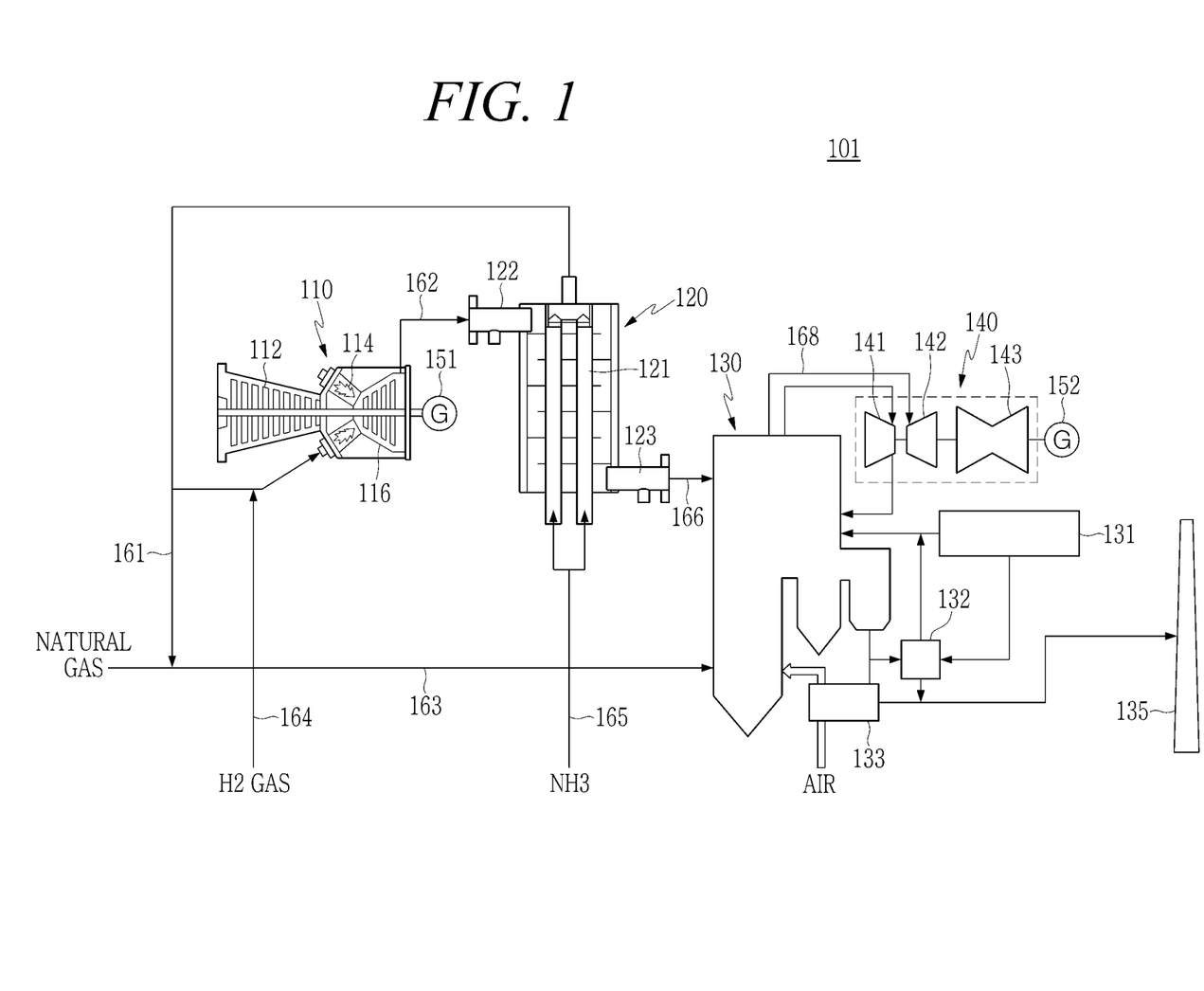
FIG. 1 is a configuration diagram showing a combined power plant according to a first exemplary embodiment.

FIG. 1 is a configuration diagram showing a combined power plant according to a first exemplary embodiment.

Referring to FIG. 1, a combined power plant 101 includes a plurality of turbines to produce power. The combined power plant 101 includes a gas turbine 110, a boiler 130, an ammonia decomposition apparatus 120, a steam turbine 140, and a decomposed gas supply line 161.

The gas turbine 110 can compress atmospheric air at high pressure, combust the compressed air and fuel in a static pressure environment to release thermal energy, expand high-temperature combustion gas to convert combustion gas into kinetic energy, and release an exhaust gas containing the remaining energy to the atmosphere.

The gas turbine 110 can include a compressor 112, a combustor 114, and a main turbine 116. The compressor 112 of the gas turbine 110 can suck and compress the air from the outside. The compressor 112 can supply compressed air to the combustor 114 and also supply cooling air to a high-temperature region of the gas turbine 110 that is required to be cooled. Because the sucked air is compressed in the compressor 112 through an adiabatic compression process, the pressure and temperature of the air passing through the compressor 112 increases.

The compressor 112 may be designed in a form of a centrifugal compressor or an axial compressor, and the centrifugal compressor is applied to a small-scale gas turbine whereas a multistage axial compressor is applied to a large-scale gas turbine 110 to compress a large amount of air.

The combustor 114 can generate a combustion gas with high energy by mixing compressed air supplied from an outlet of the compressor 112 with fuel to combust the mixture at a constant pressure.

The high-temperature and high-pressure combustion gas generated by the combustor 114 is supplied to the main turbine 116. In the main turbine 116, the combustion gas provides collision and a reaction force to a plurality of blades radially disposed on a rotary shaft of the main turbine 116 while being subjected to adiabatic expansion so that thermal energy of the combustion gas is converted into mechanical energy that rotates the rotary shaft.

The main turbine 116 is connected to a first generator 151 to generate power, and the steam turbine 140 can be connected to a second generator 152 to generate power. Alternatively, the main turbine 116 and the steam turbine 140 can be connected in series, and one generator can be connected thereto.

The combustion gas discharged from the main turbine 116 is supplied to the ammonia decomposition apparatus 120. The ammonia decomposition apparatus includes an introduction port 122 through which the combustion gas is introduced, a discharge port 123 through which the combustion gas is discharged, and a plurality of passages 121 through which ammonia moves. The passage 121 can be formed of a pipe or a membrane, and catalyst is filled in the passage 121. As the catalyst, various types of catalyst such as Ru/LaCe, Ru/CGO, and Ru/MgO used for decomposing ammonia can be used.

Liquid or gaseous ammonia can be converted into a decomposed gas containing hydrogen, nitrogen, and ammonia by high heat and catalyst. For efficient decomposition of ammonia, the temperature inside the ammonia decomposition apparatus 120 should be maintained at 550 to 650° C., and the combustion gas discharged from the gas turbine 110 should be able to supply sufficient heat to the ammonia decomposition apparatus 120. Meanwhile, the combustion gas can be cooled in an ammonia decomposition process and discharged from the ammonia decomposition apparatus 120 at a temperature of 200 to 350° C.

The decomposed gas supply line 161 is connected to the ammonia decomposition apparatus 120, and the decomposed gas generated by the ammonia decomposition apparatus 120 and containing hydrogen, ammonia, and nitrogen is supplied to the combustor 114 of the gas turbine 110 through the decomposed gas supply line 161.

The combined power plant 101 can further include a hydrogen gas supply line 164, a fuel gas supply line 163, an ammonia supply line 165, a first combustion gas supply line 162, and a second combustion gas supply line 166.

The ammonia supply line 165 is connected to the ammonia decomposition apparatus 120 to supply ammonia to the ammonia decomposition apparatus 120. The ammonia supplied through the ammonia supply line 165 can be in a liquid form. The ammonia supply line 165 can also be connected to the fuel gas supply line 163 to supply ammonia to the fuel gas supply line 163.

The hydrogen gas supply line 164 supplies a hydrogen gas to the combustor 114 so that the hydrogen gas and the decomposed gas are supplied to the combustor 114 as fuel, and the combustor 114 combusts the hydrogen gas and the decomposed gas to generate the combustion gas.

Because the decomposed gas is not generated at an initial stage of driving the gas turbine 110, the combustor 114 can combust using only hydrogen gas. The hydrogen gas supply line 164 can be directly connected to the combustor 114, and can also be connected to the decomposed gas supply line 161. In addition, the hydrogen gas supply line 164 can be connected to the fuel gas supply line 163 to supply a hydrogen gas to the fuel gas supply line 163.

Here, if the hydrogen gas and the decomposed gas are supplied to the combustor 114, it is possible to perform mixed combustion power generation using ammonia and hydrogen without generating carbon dioxide. If the gas turbine is driven using only ammonia and hydrogen, it is possible to significantly reduce carbon dioxide emissions and contribute to achieving carbon neutralization.

The combustion gas discharged from the gas turbine 110 is supplied to the ammonia decomposition apparatus 120 through the first combustion gas supply line 162. Meanwhile, the second combustion gas supply line 166 connects the ammonia decomposition apparatus 120 and the boiler 130 to deliver the combustion gas discharged from the ammonia decomposition apparatus 120 to the boiler 130 to heat steam using the combustion gas.

The boiler 130 receives fuel gas through the fuel gas supply line 163, and heats feedwater by using heat from combusting the fuel gas. In this case, the fuel gas can be formed of natural gas. Therefore, the boiler 130 can heat the feedwater to high-temperature and high-pressure steam by using the heat generated by combusting the fuel gas and the heat of the combustion gas delivered from the ammonia decomposition apparatus 120.

The boiler 130 can include an air preheater 133 configured to preheat air, an economizer 132 configured to preheat feedwater, and a water supply system 131 configured to condense the steam discharged from the steam turbine 140 and supply the steam back to the boiler 130. The high-temperature gas discharged from the boiler 130 may be cooled and purified and discharged to the outside through a flue 135.

The steam generated in the boiler 130 is delivered to the steam turbine 140 through a steam supply line 168, and the feedwater cooled by the steam turbine 140 is delivered to the boiler 130 through the water supply system 131.

The steam turbine 140 rotates a blade using the steam generated by the boiler 130 and delivers rotation energy to the second generator 130. The steam turbine 140 can include a high pressure turbine 141, a medium pressure turbine 142, and a low pressure turbine 143.

The second generator 152 generates electrical energy using the rotation energy delivered from the steam turbine 140. The second generator 152 can be connected to an energy storage system (ESS) or a system to store or supply power.

Hereinafter, a method for operating the combined power plant according to the first exemplary embodiment will be described.

Figure 2:
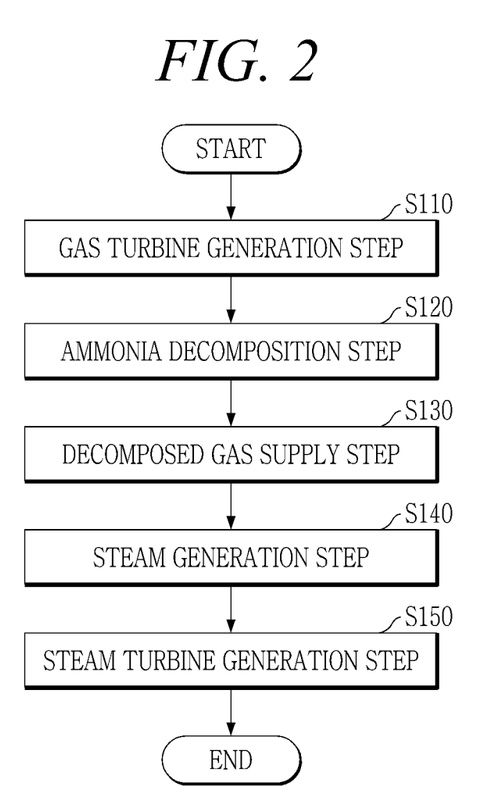
FIG. 2 is a flowchart for explaining a method for operating the combined power plant according to the first exemplary embodiment.

FIG. 2 is a flowchart for explaining a method for operating the combined power plant according to the first exemplary embodiment.

Referring to FIGS. 1 and 2, the method for operating the combined power plant according to the first exemplary embodiment can include a gas turbine generation step (operation S110), an ammonia decomposition step (operation S120), a decomposed gas supply step (operation S130), a steam generation step (operation S140), and a steam turbine generation step (operation S150).

The gas turbine 110 combusts fuel to rotate the blade to generate power (operation S110). In the gas turbine generation step (operation S110), the gas turbine 110 initially combusts using hydrogen, and generates combustion gas using the hydrogen and decomposed gas when the decomposed gas is supplied.

The ammonia decomposition apparatus 120 receives combustion gas generated in the gas turbine 110 to decompose ammonia to generate decomposition gas containing hydrogen, nitrogen, and ammonia (operation S120). In the ammonia decomposition step (operation S120), the ammonia decomposition apparatus 120 converts liquid ammonia into decomposed gas using catalyst, and the ammonia can be heated by the combustion gas at 550 to 650° C.

The ammonia decomposition apparatus 120 supplies the decomposed gas generated in the ammonia decomposition step (operation S120) to the combustor 114 of the gas turbine 110 (operation S130). In the decomposed gas supply step (operation S130), the ammonia decomposition apparatus 120 can mix hydrogen gas with the decomposed gas to supply the mixture to the combustor 114 of the gas turbine 110.

The boiler 130 generates steam by receiving the combustion gas from the ammonia decomposition apparatus 120 and heating the feedwater (operation S140). In the steam generation step (operation S140), the boiler 130 receives fuel gas, mixes the decomposed gas with the fuel gas, and combusts the mixture of the fuel gas and the decomposed gas to heat the feedwater. In this case, the fuel gas can be formed of natural gas. In addition, the boiler 130 supplies the steam generated in the steam generation step (operation S140) to the steam turbine 140 to rotate the blade and to generate power using the rotating force (operation S150).

According to the first exemplary embodiment, it is possible to decompose ammonia using the combustion gas generated in the gas turbine 110 to generate decomposed gas, and supply the decomposed gas to the gas turbine 110 to significantly reduce carbon while driving the gas turbine 110. In addition, it is also possible to supply the combustion gas cooled by the ammonia decomposition apparatus 120 to the boiler 130, so that the variety and ease of the material and design of the boiler 130 can be secured.

Figure 3:
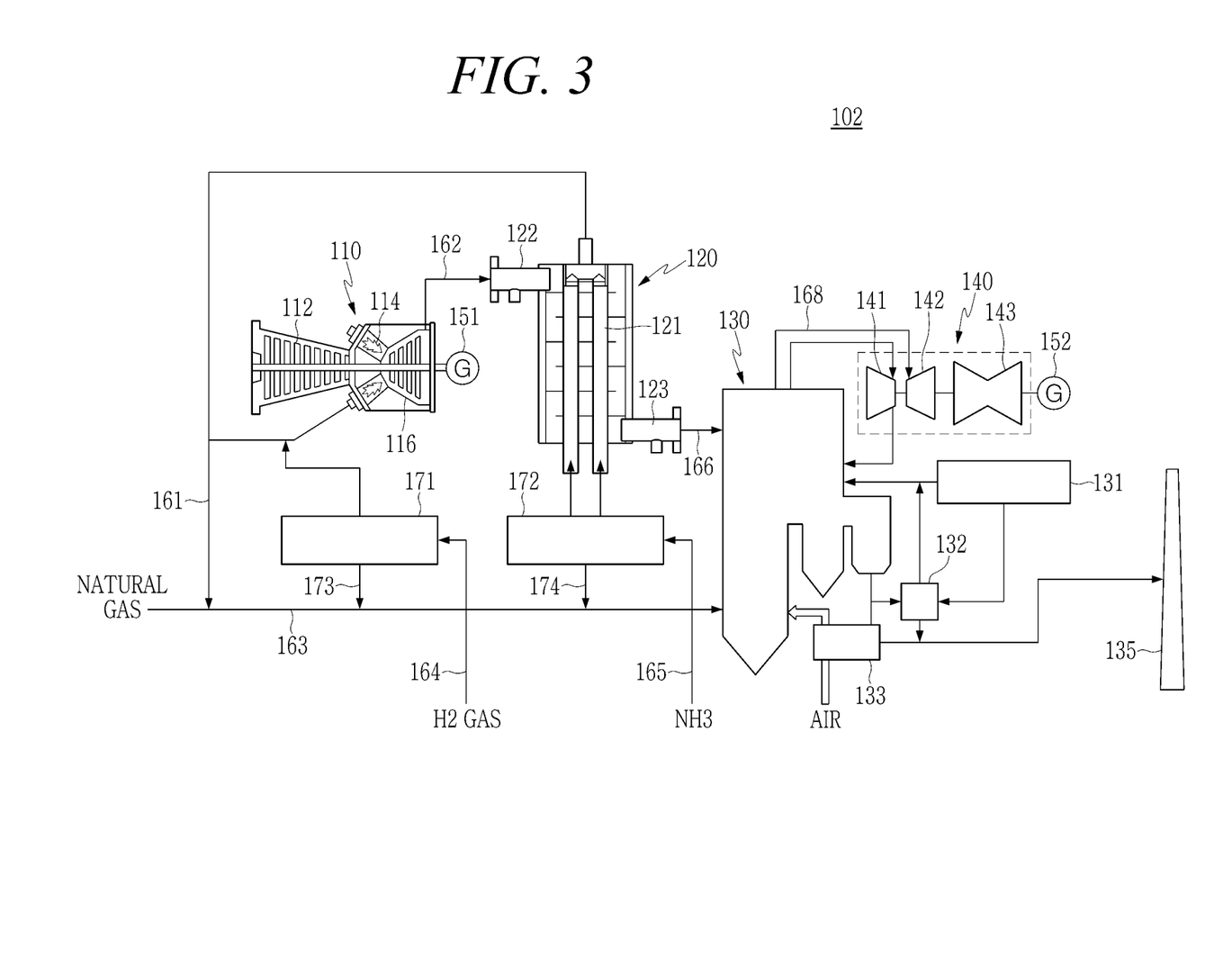
FIG. 3 is a configuration diagram showing a combined power plant according to a second exemplary embodiment.

Hereinafter, a combined power plant according to a second exemplary embodiment will be described. FIG. 3 is a configuration diagram for explaining the combined power plant according to a second exemplary embodiment.

Referring to FIG. 3, a combined power plant 102 can further include a hydrogen tank 171, an ammonia tank 172, a hydrogen gas delivery line 173, and an ammonia delivery line 174. Because the combined power plant 102 according to the second exemplary embodiment has the same structure as that of the first exemplary embodiment of FIG. 1 except for the hydrogen tank 171, the ammonia tank 172, the hydrogen gas delivery line 173, and the ammonia delivery line 174, a redundant description of the same configuration will be omitted.

The hydrogen tank 171 configured to store hydrogen is connected to the hydrogen gas supply line 164, and the hydrogen gas delivery line 173 configured to deliver hydrogen gas to the fuel gas supply line 163 is connected to the hydrogen tank 171. Alternatively, the hydrogen gas delivery line 173 can directly connect the hydrogen gas supply line 164 to the fuel gas supply line 163.

The hydrogen gas delivery line 173 can receive hydrogen directly from the hydrogen gas supply line 164 or receive hydrogen from the hydrogen gas supply line 164 through the hydrogen tank 171 to supply hydrogen to the fuel gas supply line 163. Here, when the hydrogen tank 171 is installed, hydrogen can be stably supplied to the combustor 114, and hydrogen can also be supplied to the fuel gas supply line 163.

The ammonia tank 172 configured to store liquid ammonia is connected to the ammonia supply line 165, and the ammonia delivery line 174 configured to deliver ammonia to the fuel gas supply line 163 is connected to the ammonia tank 172. Alternatively, the ammonia delivery line 174 can directly connect the ammonia supply line 165 to the fuel gas supply line 163. When the ammonia tank 172 is installed, ammonia can be stably supplied to the ammonia decomposition apparatus 120 and ammonia can also be supplied to the fuel gas supply line 163. In addition, the decomposed gas supply line 161 configured to supply decomposed gas is connected to the fuel gas supply line 163.

According to the second exemplary embodiment, because the hydrogen gas delivery line 173, the ammonia delivery line 174, and the decomposed gas supply line 161 are connected to the fuel gas supply line 163 through which the natural gas moves, the decomposed gas, the ammonia, and the hydrogen gas can be mixed with the natural gas through the fuel gas supply line 163 and can be supplied to the boiler 130. Therefore, carbon generation can be reduced compared to the case of heating the feedwater by combusting only natural gas.

Hereinafter, a method for operating the combined power plant according to the second exemplary embodiment will be described.

Figure 4:
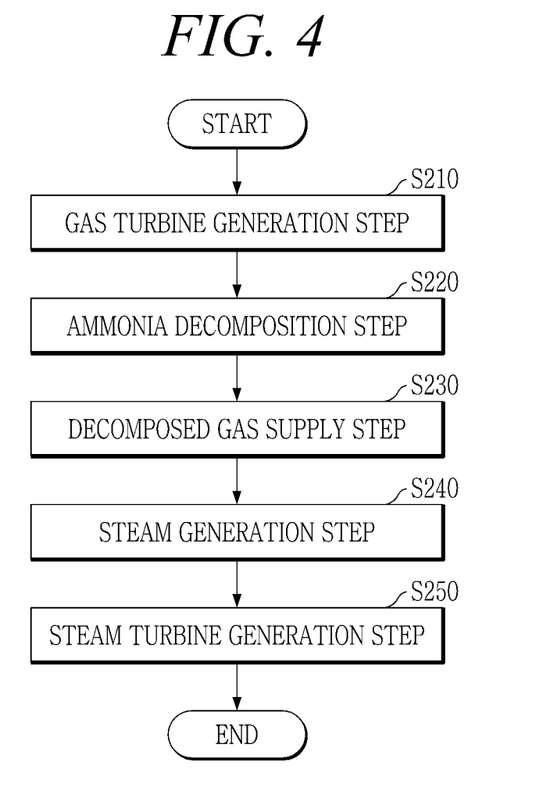
FIG. 4 is a flowchart for explaining a method for operating the combined power plant according to the second exemplary embodiment.

FIG. 4 is a flowchart for explaining a method for operating the combined power plant according to the second exemplary embodiment.

Referring to FIGS. 3 and 4, the method for operating the combined power plant according to the second exemplary embodiment can include a gas turbine generation step (operation S210), an ammonia decomposition step (operation S220), a decomposed gas supply step (operation S230), a steam generation step (operation S240), and a steam turbine generation step (operation S250).

The gas turbine 110 combusts fuel to rotate the blade to generate power (operation S210). The ammonia decomposition apparatus 120 receives combustion gas generated in the gas turbine 110 to decompose ammonia to generate decomposition gas containing hydrogen, nitrogen, and ammonia (operation S220). The ammonia decomposition apparatus 120 supplies the decomposed gas generated in the ammonia decomposition step (operation S220) to the combustor 114 of the gas turbine 110 (operation S230).

The boiler 130 generates steam by receiving the combustion gas from the ammonia decomposition apparatus 120 and heating feedwater (operation S240). In the steam generation step (operation S240), the boiler 130 can supply decomposed gas to fuel gas to mix the fuel gas and the decomposed gas, supply hydrogen gas to the fuel gas to mix the fuel gas and the hydrogen gas, and supply liquid or gaseous ammonia to the fuel gas to mix the fuel gas and the ammonia, and the boiler 130 can receive the mixture. In this case, the liquid ammonia can be sprayed in a form of fine particles and mixed with the fuel gas.

In the steam generation step (operation S240), the boiler 130 can combust mixture of the fuel gas and the decomposed gas, mixture of the fuel gas and the hydrogen gas, and mixture of the fuel gas and the ammonia to heat air, and heat feedwater using the heated air and the combustion gas. Here, the fuel gas can be formed of natural gas. In addition, the boiler 130 supplies the steam generated in the steam generation step (operation S240) to the steam turbine 140 to generate power (operation S250).

According to the exemplary embodiment, when the decomposed gas, the hydrogen gas, and the ammonia are mixed with the fuel gas, low-temperature natural gas can be heated while being mixed with the decomposed gas, the hydrogen gas, and the ammonia, and can be mixed with fuel containing carbon to reduce carbon emission.

Hereinafter, a combined power plant according to a third exemplary embodiment will be described.

Figure 5:
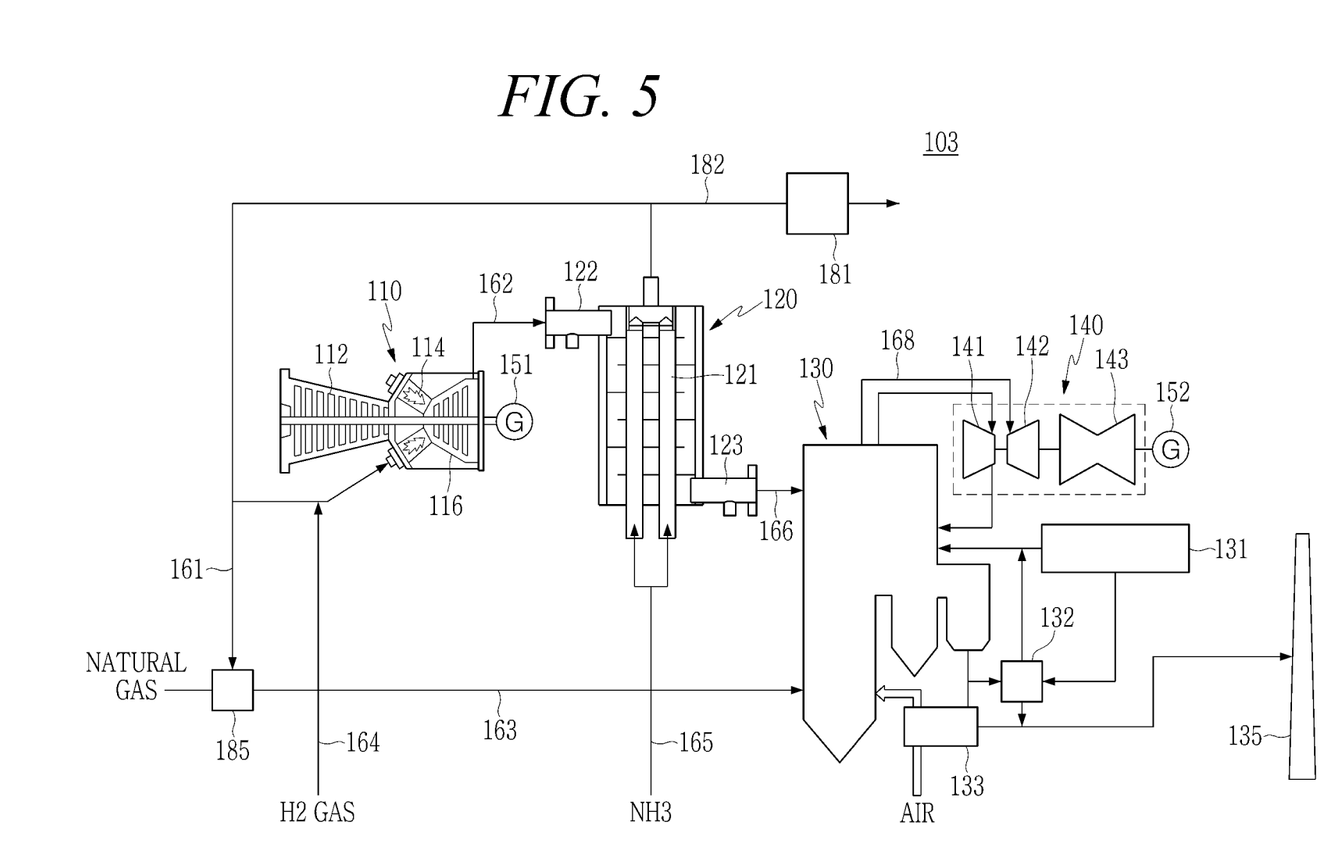
FIG. 5 is a configuration diagram showing a combined power plant according to a third exemplary embodiment.

FIG. 5 is a configuration diagram for explaining a combined power plant according to a third exemplary embodiment.

Referring to FIG. 5, a combined power plant 103 can further include a hydrogen extraction device 181 and a decomposed gas mixing device 185. Because the combined power plant 103 according to the third exemplary embodiment has the same structure as that of the first exemplary embodiment of FIG. 1 except for the hydrogen extraction device 181 and the decomposed gas mixing device 185, a redundant description of the same configuration will be omitted.

A decomposed gas extraction line 182 is connected to the ammonia decomposition apparatus 120, and the hydrogen extraction device 181 configured to extract hydrogen gas from decomposed gas can be installed in the decomposed gas extraction line 182. The hydrogen extraction device 181 can be configured to extract high-purity hydrogen through a pressure swing adsorption (PSA) process. The hydrogen gas extracted by the hydrogen extraction device 181 can be supplied to a hydrogen charging station.

The decomposed gas mixing device 185 is connected to the fuel gas supply line 163 and the decomposed gas supply line 161 to mix fuel gas and decomposed gas to heat the fuel gas. The fuel gas can be formed of a liquefied natural gas, and when high-temperature decomposition gas heats the liquefied natural gas and heated liquefied natural gas is supplied to the boiler 130, the combustion efficiency of the boiler 130 can be improved.

Hereinafter, a method for operating the combined power plant according to the third exemplary embodiment will be described.

Figure 6:
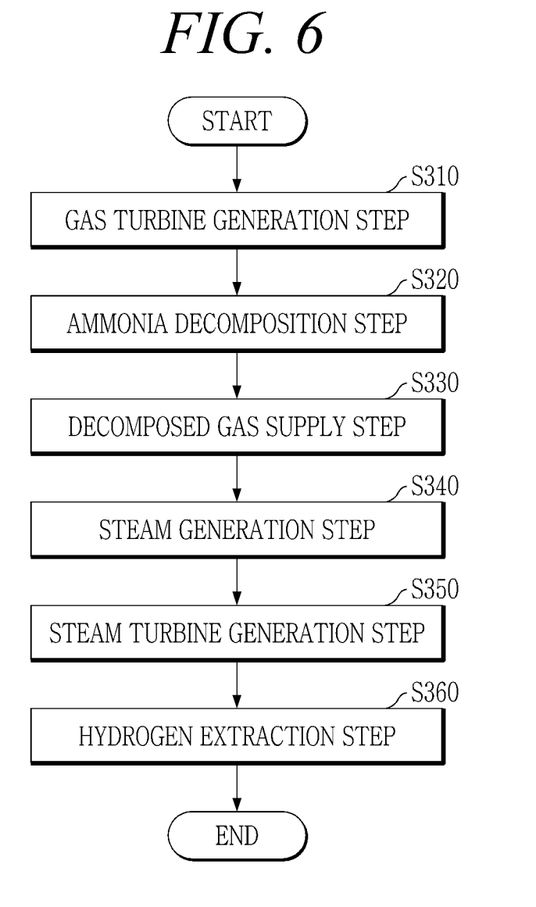
FIG. 6 is a flowchart for explaining a method for operating the combined power plant according to the third exemplary embodiment.

FIG. 6 is a flowchart for explaining a method for operating the combined power plant according to the third exemplary embodiment.

Referring to FIGS. 5 and 6, the method for operating the combined power plant according to the third exemplary embodiment can include a gas turbine generation step (operation S310), an ammonia decomposition step (operation S320), a decomposed gas supply step (operation S330), a steam generation step (operation S340), a steam turbine generation step (operation S350), and a hydrogen extraction step (operation S360).

The gas turbine 110 combusts fuel to rotate the blade to generate power (operation S310). The ammonia decomposition apparatus 120 receives combustion gas generated in the gas turbine 110 to decompose ammonia to generate decomposed gas containing hydrogen, nitrogen, and ammonia (operation S320). The ammonia decomposition apparatus 120 supplies the decomposed gas generated in the ammonia decomposition step (operation S320) to the combustor 114 of the gas turbine 110 (operation S330).

The boiler 130 generates steam by receiving the combustion gas from the ammonia decomposition apparatus 120 and heating the feedwater (operation S340). In the steam generation step (operation S340), the boiler 130 supplies decomposed gas to fuel gas to mix the fuel gas and the decomposed gas and heats the fuel gas by exchanging heat between the fuel gas and the decomposed gas to supply heated fuel gas to the boiler 130. In addition, the boiler 130 supplies the steam generated in the steam generation step (operation S340) to the steam turbine 140 to generate power (operation S350).

The hydrogen extraction device 181 extracts hydrogen by separating a part of the decomposed gas generated in the ammonia decomposition step (operation S320), and extracts high-purity hydrogen through the pressure swing adsorption (PSA) process (operation S360).

While one or more exemplary embodiments have been described with reference to the accompanying drawings, it will be apparent to those skilled in the art that various modifications and variations can be made by adding, changing, deleting, or substituting components without departing from the spirit and scope of the disclosure as set forth in the appended claims, and these modifications and changes fall within the spirit and scope of the disclosure as defined in the appended claims.

What is claimed is:

1. A combined power plant comprising:
   a gas turbine configured to generate a rotating force and discharge a combustion gas;
   a boiler configured to heat water to generate steam;
   an ammonia decomposition apparatus configured to receive the combustion gas generated in the gas turbine to thermally decompose ammonia to generate a decomposed gas containing hydrogen, nitrogen, and a residual ammonia;
   a steam turbine configured to generate a rotating force using the steam generated in the boiler;
   a decomposed gas supply line configured to supply the decomposed gas generated in the ammonia decomposition apparatus to a combustor of the gas turbine; and
   a fuel gas supply line connected to the boiler and configured to supply natural gas to the boiler,
   wherein the decomposed gas supply line is connected to the fuel gas supply line and configured to supply the decomposed gas to the fuel gas supply line, such that a mixture of the natural gas and the decomposed gas is provided to the boiler.

2. The combined power plant of claim 1, further comprising a hydrogen gas supply line configured to supply hydrogen gas to the combustor of the gas turbine.

3. The combined power plant of claim 2,
   wherein a hydrogen tank configured to store hydrogen gas is connected to the hydrogen gas supply line.

4. The combined power plant of claim 3, further comprising a hydrogen gas delivery line connected to the fuel gas supply line and configured to deliver hydrogen gas stored in the hydrogen tank to the fuel gas supply line such that a mixture of the natural gas, the decomposed gas and the hydrogen is provided to the boiler.

5. The combined power plant of claim 1, further comprising an ammonia supply line configured to supply ammonia to the ammonia decomposition apparatus.

6. The combined power plant of claim 5,
   wherein an ammonia tank configured to store ammonia is connected to the ammonia supply line.

7. The combined power plant of claim 6, further comprising an ammonia delivery line configured to deliver ammonia stored in the ammonia tank to the fuel gas supply line.

8. The combined power plant of claim 1, further comprising a first combustion gas supply line configured to supply combustion gas discharged from the gas turbine to the ammonia decomposition apparatus.

9. The combined power plant of claim 8, further comprising a second combustion gas supply line configured to supply combustion gas used in the ammonia decomposition apparatus to the boiler.

10. The combined power plant of claim 1,
    wherein a decomposed gas extraction line configured to extract decomposed gas is connected to the ammonia decomposition apparatus, and a hydrogen extraction device configured to extract hydrogen gas from the decomposed gas is connected to the decomposed gas extraction line.

11. A combined power plant comprising:
    a gas turbine configured to generate a rotating force and discharge a combustion gas;
    a boiler configured to heat water to generate steam;
    an ammonia decomposition apparatus configured to receive the combustion gas generated in the gas turbine to thermally decompose ammonia to generate a decomposed gas containing hydrogen, nitrogen, and a residual ammonia; and
    a decomposed gas supply line configured to supply the decomposed gas generated in the ammonia decomposition apparatus to a combustor of the gas turbine; and
    a fuel gas supply line connected to the boiler and configured to supply natural gas to the boiler,
    wherein the decomposed gas supply line is connected to the fuel gas supply line and configured to supply the decomposed gas to the fuel gas supply line, such that a mixture of the natural gas and the decomposed gas is provided to the boiler.

12. The combined power plant of claim 11, further comprising a hydrogen gas supply line configured to supply hydrogen gas to the combustor of the gas turbine.

13. The combined power plant of claim 11, further comprising a first combustion gas supply line configured to supply combustion gas discharged from the gas turbine to the ammonia decomposition apparatus.

14. A combustion power plant comprising:
    a gas turbine configured to generate a rotating force and discharge a combustion gas;
    a boiler configured to heat water to generate steam;
    an ammonia decomposition apparatus configured to receive the combustion gas generated in the gas turbine to thermally decompose ammonia to generate a decomposed gas containing hydrogen, nitrogen, and a residual ammonia;
    a steam turbine configured to generate a rotating force using the steam generated in the boiler;
    a decomposed gas supply line configured to supply the decomposed gas generated in the ammonia decomposition apparatus to a combustor of the gas turbine;
    a fuel gas supply line connected to the boiler and configured to supply fuel gas to the boiler; and
    a decomposed gas mixing device connected to the fuel gas supply line and the decomposed gas supply line and configured to mix the fuel gas and the decomposed gas.

15. The combustion power plant of claim 14,
    wherein the fuel gas includes natural gas.

16. The combustion power plant of claim 15,
    wherein the decomposed gas mixing device is configured to heat the fuel gas by the decomposed gas such that the fuel gas heated by and mixed with the decomposed gas is provided to the boiler.

* * * * *